US005643381A

United States Patent [19]

Iwafune et al.

[11] Patent Number: 5,643,381

[45] Date of Patent: Jul. 1, 1997

[54] METHOD OF PRODUCING BLANKET BELT FOR USE IN PRINTING MACHINE

[75] Inventors: Tomoaki Iwafune, Nagano; Koichi Kamoi, Tokyo, both of Japan

[73] Assignees: Nagano Japan Radio Co., Ltd., Nagano-ken; Gradco (Japan) Ltd., Toyko, both of Japan

[21] Appl. No.: 570,518

[22] Filed: Dec. 11, 1995

[30] Foreign Application Priority Data

Feb. 9, 1995 [JP] Japan .................................... 7-046516

[51] Int. Cl.[6] .................................................... B32B 09/00

[52] U.S. Cl. ............................................ 156/141; 428/909

[58] Field of Search .................................... 428/909, 167, 428/247, 286, 287; 156/137, 138, 140, 141, 245; 118/659; 355/256

[56] References Cited

U.S. PATENT DOCUMENTS 5,209,961 5/1993 Yokoi ...................................... 428/167
5,352,507 10/1994 Bresson et al. ......................... 428/909
5,356,693 10/1994 Tomono et al. ........................ 428/909
5,390,597 2/1995 Hashimoto et al. .

*Primary Examiner*—Michael W. Ball
*Assistant Examiner*—Michael A. Tolin
*Attorney, Agent, or Firm*—Birch, Stewart, Kolasch & Birch, LLP

[57] ABSTRACT

A blanket belt for use in a printing machine is produced through a producing step including a reinforcement member setting step P1 of setting a reinforcement member 3 onto a mold having teeth shape at an outer circumferential surface thereof, a rubber sheet setting step P2 of setting a green rubber sheet made of a rubber material for use in a blanket, on the reinforcement member 3 set onto the mold, a vulcanizing step P3 of forming teeth T . . . for use in a timing belt on an inner surface thereof by vulcanizing an intermediate produced article obtained on the rubber sheet setting step P2, and obtaining an endless timing belt having the reinforcement member 3 at an inside thereof, and a blanket surface working step P4 of working an outer surface of the timing belt on a blanket surface, after vulcanizing.

Thereby, both of expansion and contraction of a blanket surface and a slip thereof to the pulleys are prevented effectively.

7 Claims, 4 Drawing Sheets

METHOD OF PRODUCING BLANKET BELT FOR USE IN PRINTING MACHINE

BACKGROUND OF THE INVENTION

1. Field of the Invention

The present invention relates to a method of producing a blanket belt for use in a printing machine, which is preferable to be used when producing a blanket belt disposed on an offset printing machine and the like.

2. Description of the Relevant Art

Generally, in an offset printing machine, a plate is wound around and charged onto a cylindrical printing drum, then an ink image fitted onto the plate on the printing drum is once transferred (off) to a blanket drum, and the ink image transferred to the blanket drum is printed (set) onto a printing sheet. Such a blanket drum is provided with a blanket at an outer surface thereof, and this blanket is formed as a sheet-like body of a two layer construction comprising a reinforcing layer of a cloth and the like for preventing expansion and construction, and a rubber layer made of nitrile rubber such as NBR.

On the other hand, since the blanket drum is utilized at a circumferential surface thereof, if a size of the printing plate is made large, the blanket drum becomes large, so that there is caused a large-sizing of the printing machine. Therefore, up to now, there has been also proposed in U.S. Pat. No. 5,390,597 an endless blanket belt is hung on between a pair of pulleys spaced from each other, instead of the blanket drum.

However, there are caused the following problems in a case where a general blanket fitted onto the blanket drum is applied to the aforementioned blanket belt.

At first, in a case where the blanket is charged onto the blanket drum, a thickness itself of the blanket does not come into question. However, in a case where the blanket is applied to the blanket belt, an outer surface of the blanket belt is stretched at the pulley. On the other hand, since the contraction is caused at a position except the pulley due to a reaction thereof, there is a fear that the expansion and contraction are caused on the blanket belt at the time of the printing, so that a quality of printing is degraded.

Secondly, although the movement of the blanket belt and the rotation of the pulley must coincide (synchronize) with each other perfectly, the blanket cannot be moved correctly and stably due to a slip caused between the blanket and the pulley. In this regard also, there is a fear that the quality of printing is degraded.

SUMMARY OF THE INVENTION

It is, therefore, an object of the present invention to provide a method of producing a blanket belt for use in a printing machine which can prevent effectively both of expansion and constriction of a blanket surface and a slip thereof to a pulley, and can usually ensure a high quality of printing.

In order to attain the object, the present invention is characterized in that a blanket belt for use in a printing machine is produced through a producing step including a reinforcement member setting step P1 of setting a reinforcement member 3 onto a mold having a tooth shape at an outer circumferential surface thereof, a rubber sheet setting step P2 of setting a green rubber sheet made of a rubber material for use in a blanket, on the reinforcement member 3 set onto the mold, a vulcanizing step P3 of forming teeth T . . . for use in a timing belt on an inner surface thereof by vulcanizing an intermediate produced article obtained on the rubber sheet setting step P2, and obtaining an endless timing belt having the reinforcement member 3 at an inside thereof, and a blanket surface working step P4 of working an outer surface of the timing belt on a blanket surface 2, after vulcanizing.

In this case, the reinforcement setting step P1 includes a tooth cloth setting step of setting a tooth cloth R on the mold before the reinforcement member 3 is set thereto. Also, the blanket surface working step P4 includes a polishing step of polishing an outer surface of the timing belt to thereby finish it into the blanket surface 2. On the other hand, a reinforcing core wire may be wound therearound or a reinforcing mesh sheet may be wound therearound in the reinforcement member setting step P1. Incidentally, it is preferable that NBR is used for the rubber material for use in the blanket.

Therefore, at the time of the producing, at first, in the reinforcing material charging step P1, the reinforcing material 3 is charged onto the mold. On this occasion, in the tooth cloth charging step, before the reinforcing material 3 is charged thereonto, the tooth cloth R is charged onto the mold. Also, the reinforcing material 3 is wound around the outer circumferential surface of the mold (or the tooth cloth R) by utilizing the reinforcing core wire or the reinforcing mesh sheet.

On the other hand, in the rubber sheet charging step P2, the green rubber sheet made of a blanket rubber material is charged on the reinforcing material 3 charged onto the mold. Also, in the vulcanizing step P3, an intermediate produced article obtained from the rubber sheet charging step P2 is vulcanized. Thereby, one portion of the rubber sheet reaches the outer surface of the mold (or the tooth cloth R) through the reinforcing material 3. Therefore, there is obtained an endless timing belt into which the reinforcing material 3 is inserted, and having at an inner surface thereof teeth T . . . for use in the timing belt.

Then, in the blanket surface working step P4, the outer surface of the timing belt after vulcanizing is worked into the blanket surface 2. That is, in the polishing step, the outer surface of the timing belt is polished and finished into the blanket surface 2, so that the blanket belt 1 is obtained.

Since such a blanket belt 1 is constituted as the endless timing belt, the slip between the blanket belt and the pulleys is eliminated when the blanket is hung on between the pulleys, and to make a thickness thereof thinner effectively is realized due to the integration, so that the expansion and contraction thereof at the time of the movement through the pulleys is controlled.

DETAILED DESCRIPTION OF THE PREFERRED EMBODIMENT

An optimum embodiment according to the present invention will be described hereinafter with reference to the drawings.

At first, in order to facilitate an understanding of the invention, a whole schematic construction of the offset printing machine will be described hereinafter with reference to FIG. 4.

Figure 4:
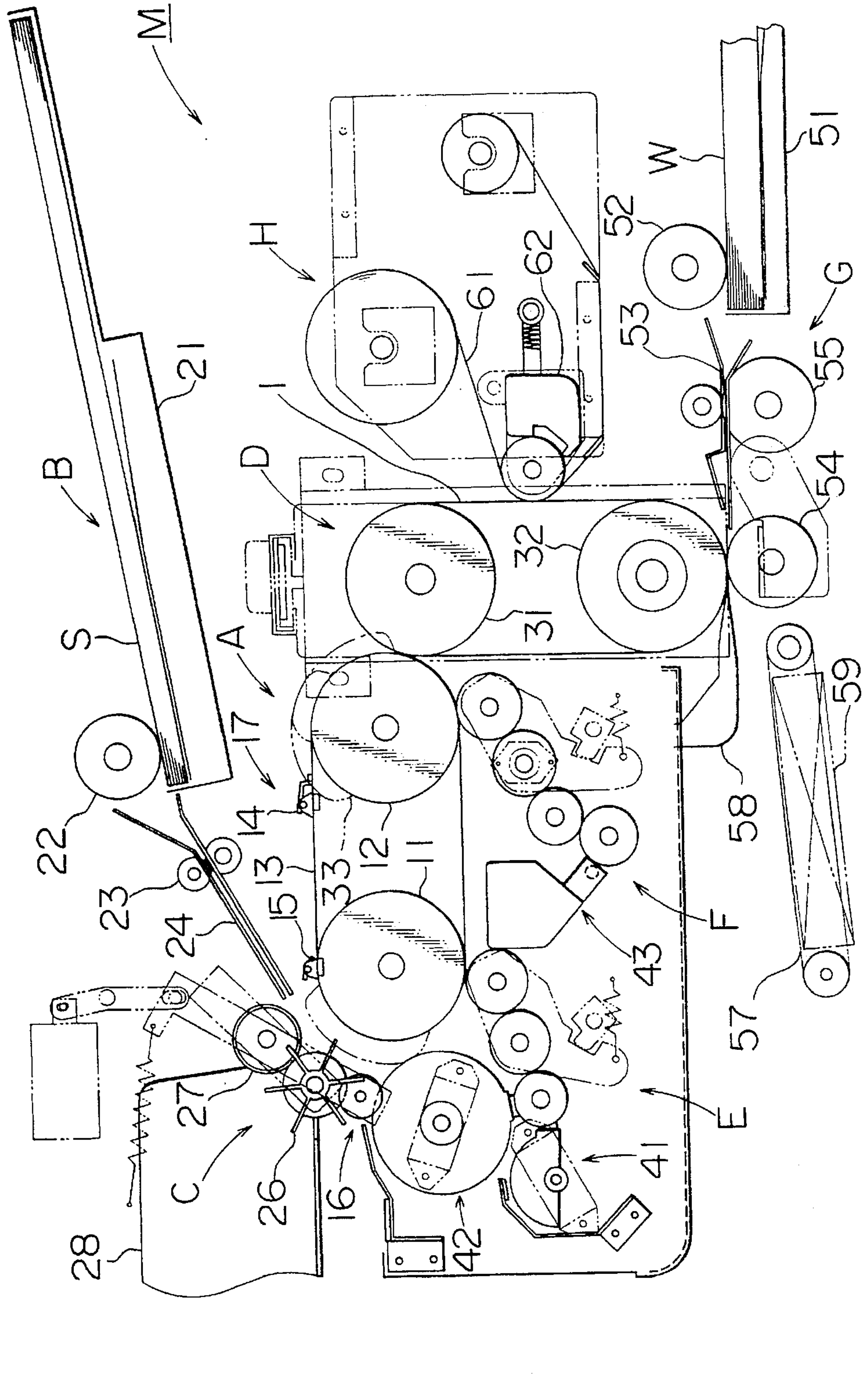
FIG. 4 is a view of an internal construction of an offset printing machine which uses the blanket belt produced by the same producing method.

FIG. 4 shows an internal construction of an offset printing machine M. Symbol A is a plate carrier mechanism, which comprises an endless plate belt 13 hung on between a pair of pulleys (gears) 11 and 12 spaced apart from each other in the horizontal direction. The plate belt 13 is a timing belt. Then, the plate carrier mechanism A is provided with a plate clamping apparatus 17 which comprises an operating mechanism 16 disposed so as to oppose to the plate belt 13.

Also, symbol B denotes an automatic plate supplying mechanism supplying a plate S to the plate carrier mechanism A, which comprises a plate tray 21 containing a plurality of plates S, a separating roller 22 taking out the plates S one by one from the plate tray 21, a plate supplying roller mechanism 23 for transporting the plates S taken out from the plate tray 21, and a guiding portion 24 for guiding the plates S.

Further, symbol C denotes an automatic plate discharging mechanism discharging the plates S automatically from the plate carrier mechanism A, which comprises a paddle roller 26 which is displaced in a side of the plate belt 13 at the time of the discharging to thereby trip up a front portion of the plate S disengaged from the plate clamping apparatus 17, a plate discharging roller mechanism 27 for transporting and discharging the tripped up plates S, and a plate collecting tray 28 for collecting the discharged plates S.

On the other hand, symbol D denotes a blanket carrier mechanism, which comprises a pair of pulleys (gears) 31, 32 spaced apart from each other in the vertical direction, and an endless blanket belt hung on between the pulleys 31 and 32. This blanket belt 1 is a timing belt produced by a producing method according to the present invention described later. In this case, the blanket belt 1 hung on the upper pulley 31 is pressure-contacted to the plate belt 13 hung on the pulley 12 positioned at a rear side of the plate carrier mechanism A, but can be displaced with an axis of the lower pulley 32 as a fulcrum, so that it is pressed by a cam 33 following by a rotation of the pulley 12, then separated from the plate belt 13 when a clamping mechanism 14 and a clamping mechanism 15 pass therethrough, and it is locked at a position spaced from the plate belt 13 by a locking mechanism (not shown).

On the other hand, symbol E denotes a treating liquid supplying mechanism, which is provided with an etching liquid supplying portion 41 containing an etching liquid and an humidifying water supplying portion 42 containing a humidifying water, and then which is adapted to be capable of spreading the etching liquid or the humidifying water selectively onto the plate S charged to the plate belt 13. Also, symbol F denotes an ink supplying mechanism, which is adapted to capable of spreading an ink to the plate S charged to the plate belt 13 from an ink supplying portion 43.

Further, symbol G denotes an printing mechanism, which comprises a printing sheet tray 51 for containing a plurality of printing sheets W . . . , a separating roller 52 for separating and taking out printing sheets W from the printing sheet tray 51 one by one, a guiding roller 53 for guiding the printing sheet W taken out form the printing sheet tray 51, a pressure-contacting roller 54 being capable of pressure-contacting onto the blanket belt 1, a supplying sheet roller mechanism 55 for sending the printing sheet W between the pressure-contacting roller 54 and the blanket belt 1, and a transferring belt mechanism 57 for transferring the printing sheet W sent from between the pressure-contacting roller 54 and the blanket belt 1 to a printing sheet collecting tray (not shown). Incidentally, reference numeral 58 denotes a tearing off the printing sheet W from the blanket belt 1 by jetting air, 59 is a suction unit for making the transferring belt mechanism 57 attract the printing sheet W.

Moreover, symbol H denotes a cleaning mechanism, which removes a residue ink on the blanket belt 1 by a cleaning liquid supplied from a cleaning sheet 61 such as a cloth supplied from a roll, and a cleaning liquid supplying portion 62.

Figure 1:
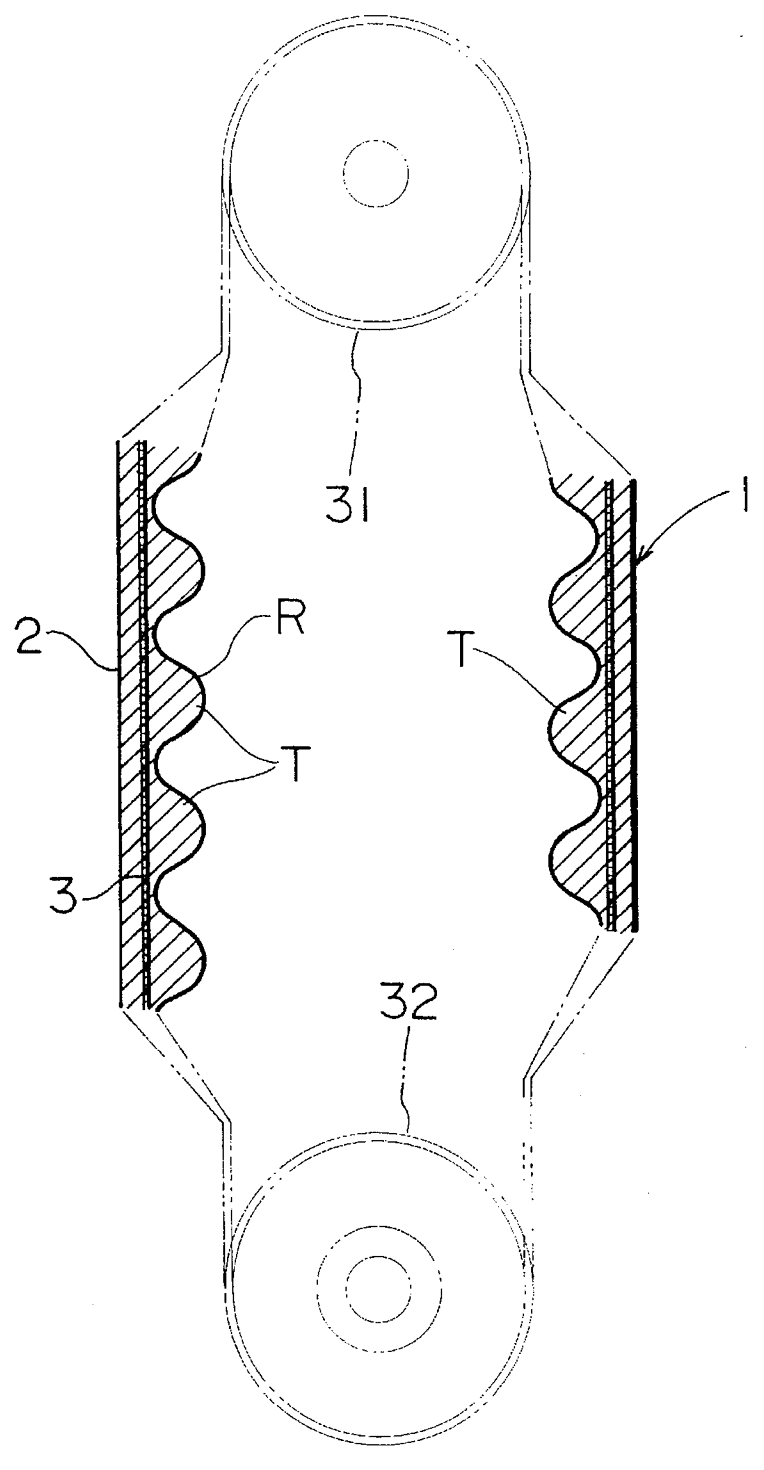
FIG. 1 is a side sectional view of a blanket belt produced by a producing method according to the present invention.
Figure 2:
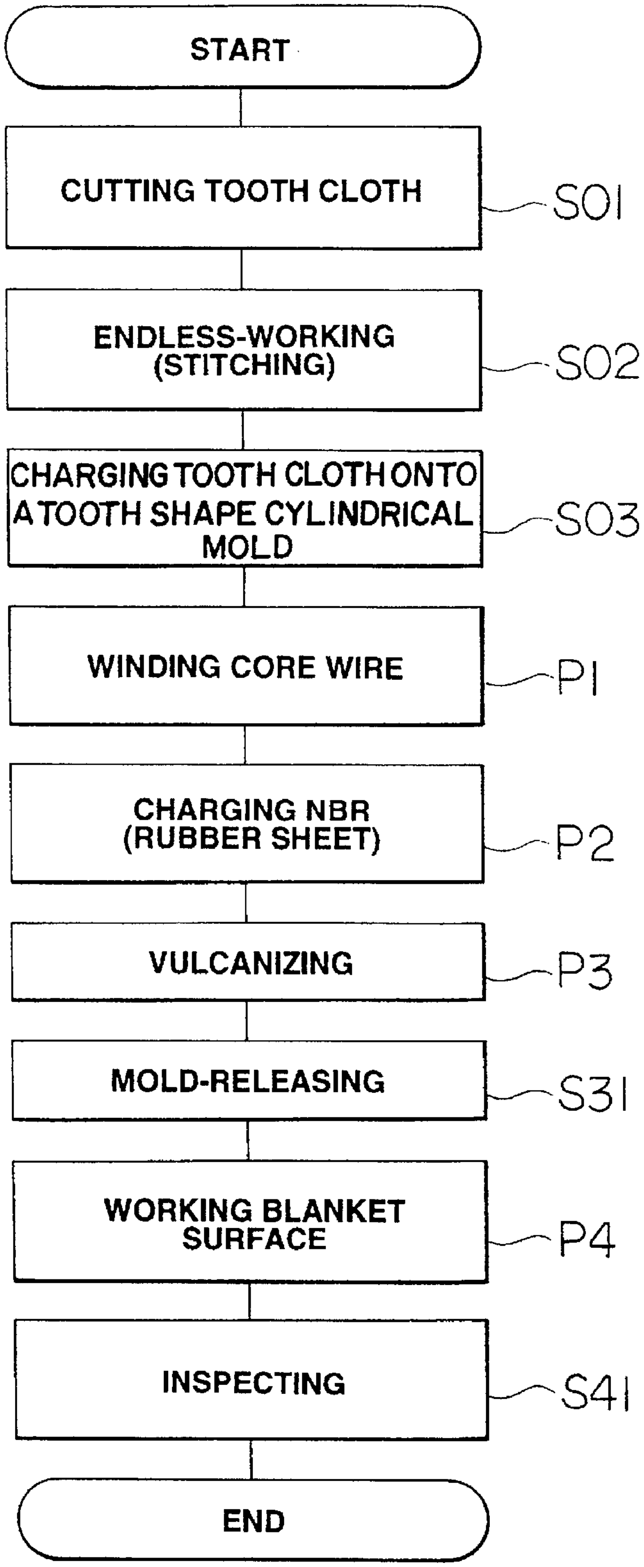
FIG. 2 is a view of a producing step according to the same producing method.
Figure 3:
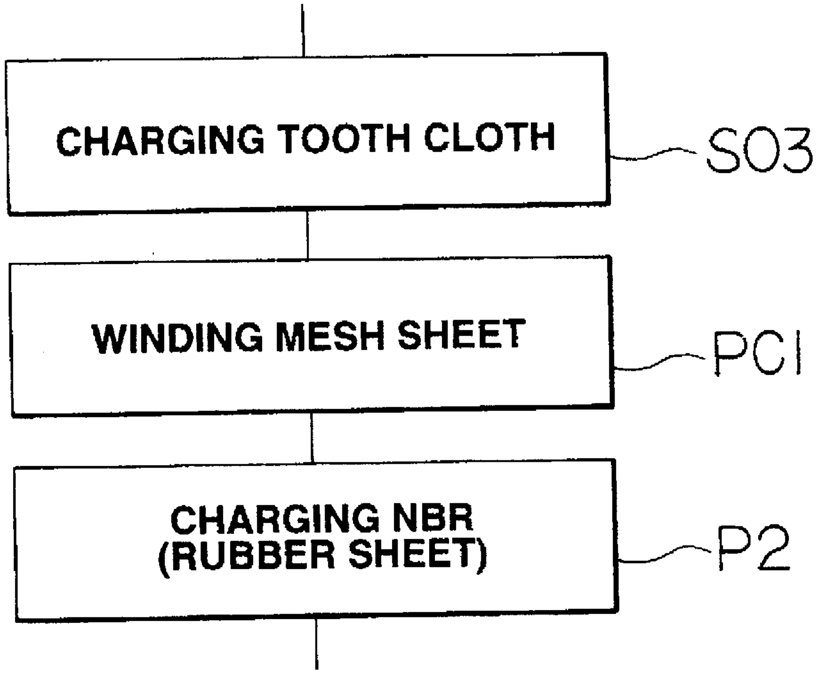
FIG. 3 is a view of a part of a producing step according to the same producing method.

Next, a preferable method of producing the blanket belt 1 by such an offset printing machine M will be described hereinafter with reference to a view of a producing step shown in FIGS. 2 and 3, and FIG. 1.

At first, in a preparing step, a tooth cloth is cut at a predetermined size (a step S 01). Then, both ends of the cut tooth cloth are stitched with each other to be made an endless manner (a step S02).

On the other hand, in a tooth cloth charging step S03, the tooth cloth R obtained on the step S02 is charged onto a cylindrical mold having a tooth shape on an outer circumferential surface thereof. Moreover, it is desirable to use a nylon canvas and the like which is superior in abrasion resistant property as the tooth cloth R. Also, a mold releasing agent is previously spread onto the mold. Noise can be decreased and the durability can be improved by using such a tooth cloth R.

Next, in the reinforcing material charging step P1, the reinforcing material 3 is charged on the tooth cloth R charged onto the mold. That is, a core wire such as glass fiber cord, alamide fiber, keplar fiber, nylon fiber, rayon fiber and the like are wound on the tooth cloth R. The expansion and contraction of the blanket surface 2 described later is controlled by charging such a reinforcing material 3. In this case, as shown in FIG. 3, a reinforcing mesh sheet (cloth sheet and the like) may be wound therearound (a step PC1) instead of winding the reinforcing core wire therearound. Thereby, the expansion and contraction of the blanket surface 2 in a longitudinal direction and in a widthwise direction is restricted surely. Moreover, the same material as that of the reinforcing core wire can be utilized also for the reinforcing mesh sheet. In this case, the reinforcing core wire and the reinforcing mesh sheet are used jointly.

Also, in the rubber charging step P2, the green rubber sheet made of NBR which is preferable as the blanket rubber material is wound around and charged on the reinforcing material 3 charged onto the mold.

On the other hand, in the vulcanizing step P3, an intermediate produced article obtained from the rubber sheet charging step P2 is vulcanized. Thereby, one portion of the rubber sheet reaches the tooth cloth R through the reinforcing material 3, and then an endless timing belt, into which the reinforcing material 3 is inserted, and having at an inner surface thereof teeth T . . . for use in the timing belt. Incidentally, the step S03 to the step P3 are ensured in a state that the reinforcing material 3 is charged onto the mold. Accordingly, if the vulcanizing treatment is finished, the mold releasing is realized, so that the formed timing belt is taken out (a step S31). Then, in the blanket surface working step S4, an outer surface of the timing belt after the vulcanizing treatment is worked into the blanket surface 2. That is, in the polishing step, the outer surface of the timing belt is polished, and is finished into the blanket surface 2 having a high surface accuracy and a uniform thickness accuracy. Generally, not only the surface accuracy but also the thickness accuracy are important for the blanket, then it is optimum that the thickness except the reinforcing material 3 is 1.65–1.90 mm.

When the abovementioned steps are finished, predetermined inspections such as a slab inspection, a length measurement, a visual inspection are carried out (a step of S41). Thereby, the blanket belt 1 shown in FIG. 1 is obtained.

Next, the operation of the offset printing machine M as a whole which uses the blanket belt 1 will be described with reference to FIG. 4.

At first, the plates S . . . are set on the plate tray 21. In this case, the plate S can use the printing sheet toner-printed by a laser printer. On the other hand, the plate S set onto the plate tray 21 is charged automatically onto the surface of the plate belt 13 by an automatic plate supplying mechanism B. That is, at the time of the charging, after the fore portion of the plate S is clamped by the fore clamping mechanism 14, the plate S is charged onto the plate belt 13 and the rear portion of the plate S is clamped by the rear clamping mechanism 15. Incidentally, at the time of the charging, an etching treatment is carried out simultaneously. In this case, the ink supplying mechanism F and the blanket belt 1 are separated from the plate belt 13. Also, the treating liquid supplying mechanism E is pressure-contacted to the plate belt 13, and the etching liquid supplied from the etching liquid supplying portion 41 is spread to the plate belt 13. Thereby, contamination and dusts and the like of the plate S are removed and hydrophilic property is raised.

On one hand, in the printing step, the ink supplying mechanism F, the blanket belt 1 and the treating liquid supplying mechanism E are pressure-contacted to the plate belt 13. Also, the humidifying water is set so as to be supplied to the plate belt 13 from the humidifying water supplying portion 42. Thereby, if the plate S is advanced from a stand-by position, the humidifying water is spread to the plate S, further, the ink is spread from the ink supplying mechanism F. On this occasion, the ink is fitted only to the image portion of the plate S. Then, the ink image on the plate S is transferred to the surface of the blanket belt 1. On the other hand, in the printing mechanism G, the printing sheet W is automatically fed to between the blanket belt 1 and the pressure-contacting roller 54, and the ink image of the blanket belt 1 is transferred to the printing sheet W. Incidentally, such a printing step is repeated by the number of the printing sheets.

In this case, according to the blanket belt 1 produced by the producing method of the present invention, a slip of the blanket belt 1 and the pulleys 31 and 32 is eliminated when the blanket belt 1 is hung on between the pulleys 31 and 32, and to make a thickness thereof thinner effectively is realized, so that the expansion and contraction thereof at the time of the movement through the pulleys is controlled, then usually a high quality of printing is ensured.

Also, the plate S charged to the plate belt 13 is discharged by the automatic plate discharging mechanism C and collected to the plate collecting tray 28 when the printing of the plate S is finished. On the other hand, the residue ink of the blanket belt 1 is removed by the cleaning mechanism H.

As described above, the embodiment has been described in detail, however, the present invention is not limited to such an embodiment. Furthermore, in detail construction, shape, number, material and the like, it may be changed on occasion without departing from the spirit and the scope of the present invention.

We claim:

1. A method of producing a printing blanket belt for use in a printing machine, characterized in that the method comprises:

a reinforcement layer setting step of setting a reinforcement layer onto a cylindrical mold having a tooth shape at an outer circumferential surface thereof;

a rubber sheet setting step of setting a green rubber sheet made of a rubber material, forming a printing blanket belt on the reinforcement layer set onto the mold;

a vulcanizing step for forming teeth on said printing blanket belt on an inner surface thereof by vulcanizing an intermediate produced article obtained on the rubber sheet setting step, and obtaining an endless printing blanket belt having the reinforcement layer at an inside thereof; and a blanket surface polishing step of working an outer blanket surface of said printing blanket belt, after vulcanizing.

2. A method of producing a blanket for use in a printing machine, according to claim 1, characterized in that the reinforcement setting step includes a tooth cloth setting step of setting a tooth cloth on the mold before the reinforcement member is set thereto.

3. A method of producing a blanket for use in a printing machine, according to claim 1, characterized in that a reinforcing core wire is wound to form a layer around said cylindrical mold in the reinforcement layer setting step.

4. A method of producing a blanket for use in a printing machine, according to claim 1, characterized in that a reinforcing mesh sheet is would to form a layer around said cylindrical mold in the reinforcement layer setting step.

5. A method of producing a blanket for use in a printing machine, according to claim 1, characterized in that NBR is used for the rubber material for use in the blanket.

6. A method of producing a blanket for use in a printing machine, according to claim 2, characterized in that a reinforcing core wire is wound to form a layer around said cylindrical mold in the reinforcement layer setting step.

7. A method of producing a blanket for use in a printing machine, according to claim 2, characterized in that a reinforcing mesh sheet is wound to form a layer around said cylindrical mold in the reinforcement layer setting step.

* * * * *